United States Patent
Lutz et al.

(10) Patent No.: US 12,506,614 B2
(45) Date of Patent: Dec. 23, 2025

(54) DETECTING MANIPULATED CLIENTS IN A CONTROL SYSTEM

(71) Applicant: Siemens Aktiengesellschaft, Munich (DE)

(72) Inventors: Benjamin Lutz, Pfinztal (DE); Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 272 days.

(21) Appl. No.: 17/632,525

(22) PCT Filed: Aug. 5, 2020

(86) PCT No.: PCT/EP2020/071951
§ 371 (c)(1),
(2) Date: Feb. 3, 2022

(87) PCT Pub. No.: WO2021/023754
PCT Pub. Date: Feb. 11, 2021

(65) Prior Publication Data
US 2022/0294636 A1 Sep. 15, 2022

(30) Foreign Application Priority Data
Aug. 7, 2019 (EP) .................................... 19190414

(51) Int. Cl.
*H04L 9/32* (2006.01)
*G05B 19/418* (2006.01)
*H04L 9/08* (2006.01)

(52) U.S. Cl.
CPC ........ *H04L 9/3236* (2013.01); *G05B 19/4185* (2013.01); *H04L 9/0825* (2013.01); *H04L 9/3247* (2013.01); *G05B 2219/25205* (2013.01)

(58) Field of Classification Search
None
See application file for complete search history.

(56) References Cited

U.S. PATENT DOCUMENTS 5,835,712 A 11/1998 Dufresne
6,327,658 B1 12/2001 Susaki et al.
(Continued)

FOREIGN PATENT DOCUMENTS

DE 212015000254 6/2017
DE 112017007507 T5 * 3/2020 ........... G05B 19/042
(Continued)

OTHER PUBLICATIONS

PCT International Search Report dated Nov. 10, 2020 based on PCT/EP2020/071951 filed Aug. 5, 2020.
(Continued)

*Primary Examiner* — Ario Etienne
*Assistant Examiner* — Mohammad Yousuf A. Mian
(74) *Attorney, Agent, or Firm* — Cozen O'Connor

(57) ABSTRACT

A client-server architecture for a control system of a technical installation, wherein the client-server architecture includes at least one first device formed as a client and at least one second device that formed as a server assigned to the client, where the client is configured to establish contact with the server, and is configured to execute a code received from the server, communication from the client to the control system exists via the server which is configured to detect whether the code, which the client executes, corresponds to the code that the client received from the server, and where the server, in the event of the code not corresponding, is further configured to interrupt the execution of the code by the client and lock the client out of communication with the control system.

8 Claims, 2 Drawing Sheets

(56) References Cited

U.S. PATENT DOCUMENTS

| | | | |
|---|---|---|---|
| 6,853,987 B1* | 2/2005 | Cook | G06Q 20/383 |
| | | | 705/72 |
| 7,003,672 B2 | 2/2006 | Angelo et al. | |
| 2006/0236122 A1 | 10/2006 | Field et al. | |
| 2008/0141027 A1* | 6/2008 | Kim | H04L 9/3218 |
| | | | 726/12 |
| 2010/0275026 A1 | 10/2010 | Mclean | |
| 2011/0022214 A1* | 1/2011 | Glomann | G05B 23/0254 |
| | | | 700/108 |
| 2013/0061049 A1 | 3/2013 | Irvine | |
| 2013/0212637 A1 | 8/2013 | Guccione et al. | |
| 2013/0290729 A1* | 10/2013 | Pettigrew | G06F 21/51 |
| | | | 713/189 |
| 2014/0101444 A1 | 4/2014 | Lee et al. | |
| 2017/0315541 A1 | 11/2017 | Kreidler et al. | |
| 2020/0195617 A1* | 6/2020 | Kapp | H04L 9/0643 |

FOREIGN PATENT DOCUMENTS

| | | | |
|---|---|---|---|
| EP | 2273390 | | 1/2011 |
| EP | 2472430 | | 7/2012 |
| EP | 3013086 | | 4/2016 |
| JP | H 11-143840 | | 5/1999 |
| JP | 2006-129143 | | 5/2006 |
| JP | 2006-178592 | | 7/2006 |
| JP | 2008-537224 | | 9/2008 |
| JP | 2012-058803 | | 3/2012 |
| KR | 100663034 B1 | * | 1/2007 |
| KR | 100843081 B1 | | 7/2008 |
| KR | 101580353 B1 | | 12/2015 |
| KR | 20160059458 | | 5/2016 |
| WO | WO 2014/058166 | | 4/2014 |

OTHER PUBLICATIONS

EP Search Report dated Feb. 12, 2020 based on EP19190414 filed Aug. 7, 2019.

* cited by examiner

DETECTING MANIPULATED CLIENTS IN A CONTROL SYSTEM

CROSS-REFERENCE TO RELATED APPLICATIONS

This is a U.S. national stage of application No. PCT/EP2020/071951 filed 5 Aug. 2020. Priority is claimed on European Application No. 19190414.34 filed 7 Aug. 2019, the content of which is incorporated herein by reference in its entirety.

BACKGROUND OF THE INVENTION

1. Field of the Invention

The invention relates to a method for checking the integrity in a client server architecture of a control system of a technical plant, client server architectures for control systems of technical plants, and to the control system of the technical plant.

2. Description of the Related Art

Web-oriented operator station clients register with the web servers of operator station servers and herefrom load the code (which is generally present in JavaScript and/or HTML5) required for the operator control and monitoring and which is executed on the client side, e.g., operating view, alarm sequence displays, trend displays, alarm banners, navigation hierarchies.

If the code is loaded into the operator station client, this can also be manipulated there (e.g., via a virus, an infiltration or suchlike), so that alarms in the operator station client are no longer visualized, for instance, control and process values indicate false values etc. It is therefore necessary to protect the code loaded in the operator station client from unnoticed manipulations.

For instance, the code can be signed accordingly so that a manipulation can be detected as a result of a failed signature validation. Besides detection, it is existentially important for the operation of a process engineering plant, that a possible detected manipulation is sanctioned directly, and an immediate rehabilitation is initiated so that operation remains as unaffected as possible and the operator control and monitoring can be continued.

Currently, the code loaded in the operator station client is generally not protected against manipulations or only protected by very rudimentary mechanisms. Moreover, there are no solutions for an immediate sanctioning of possible manipulations and a seamlessly occurring rehabilitation. Therefore, on the one hand, loading of the unnoticed manipulated code can do damage.

On the other hand, if one were to detect a manipulation, as a result of implementing the recommendation established in the IT field of rejecting the manipulated code and thus the manipulated client in the case of a detected manipulation, then the operation of the affected process engineering plant would be significantly jeopardized, and the plant possibly entirely paralyzed.

SUMMARY OF THE INVENTION

It is an object of the invention to provide a client server architecture for a control system of a technical plant and a method, which enables a more secure operation of the technical plant and effectively protects this against possible manipulations.

This and other objects and advantages are achieved in accordance with the inventive by a method for checking the integrity in a client server architecture of a control system of a technical plant, where the client server architecture includes at least one first device comprises a client and at least one second device comprises a server, where the method comprises:

a) registering the client with the server and downloading a code to be executed by the client from the server;
b) generating a secret key, encrypting the secret key with the aid of a public key of the client and creating a signature for the encrypted secret key with the aid of a public key of the server by way of the server;
c) transmitting the previously encrypted and signed secret key from the server to the client;
d) checking the signature of the encrypted and signed secret key with the aid of a public key of the server;
e) if the previously checked signature is valid, then decrypting the encrypted secret key with the aid of a private key of the client via the client;
f) determining a hash value of the code with the aid of a hash function via the client;
g) encrypting the hash value with the aid of the secret key and signing the encrypted hash value with the aid of the private key of the client via the client;
h) transmitting the encrypted and signed hash value from the client to the server;
i) checking the signature of the encrypted and signed hash value with the aid of a public key of the client via the server;
j) If the previously checked signature is valid, then decrypting the encrypted hash value with the aid of the secret key via the server;
k) Determining an additional hash value of a copy of the code stored on the server and not transmitted to the client via the server;
l) in the event that the hash value and the additional hash value match, the server allows the client to communicate with the control system of the technical plant.

The technical plant can be a plant from the process industry, such as a chemical, pharmaceutical, petrochemical or a plant from the food and foodstuffs, drinks and tobacco industry. Any plants from the production industry herewith also include factories in which cars or goods of any type are produced, for instance. Technical plants, which are suited to perform the inventive method, can also come from the field of power generation. Wind turbines, solar systems or power stations for power generation are likewise included in the term technical plant.

These plants each have a control system or at least one computer-assisted module for controlling and regulating the elapsing process or the production. In the present context, a control system is understood to mean a computer-assisted technical system, which comprises functionalities for representing, operating and controlling a technical system, such as a manufacturing or production plant. In the present case, the control system comprises sensors for determining measured values and various actuators. Moreover, the control system comprises what are known as close-to-process or close-to-manufacturing components, which are used to actuate the actuators or sensors. Furthermore, the control system has inter alia mechanisms for visualizing the technical plant and for engineering. The term control system additionally also includes further computing units for more complex regulations and systems for data storage and processing.

The client can be, for example, a conventional computer, a smartphone, a tablet, or a server. The client generally has an image display apparatus, via which a user of the client obtains information displayed graphically. In order to obtain information from the control system of the technical plant, the client registers with the server and obtains a code for execution.

Both the client and also the server have asymmetric key pairs, of which in each case one is a public key and the other a private key. The private key can be hardware-bound (e.g., in what is known as a hardware secure element integrated into the underlying hardware, e.g., Trusted Platform Module (TPM) or Hardware Security Module (HSM). With minimal security requirements, the private keys can also be stored in the Windows key store, for instance.

The binding between the two keys of a key pair can be ensured via a certificate issued by a trustworthy certification authority (CA). This can be, for instance, the transport layer security (TLS) certificates of both partners (client and server) or the manufacturer certificates (Manufacturer Device Certificates) bound to the underlying hardware or the Windows certificates issued in the Windows Active Directory or a Windows Workgroup. It is likewise possible (if the topological boundary conditions of the respective operational environment allows this), for the subscriber to have requested its certificates from the LetsEncrypt CA.

In the simplest embodiment, the certificates (possibly all the associated keys) may have been acquired by purchasing from a trustworthy provider and stored in the Certificate Store of the subscriber, where, as already mentioned above, particular attention is to be paid to protecting the private key (both with its storage and also with the transmission which is only permissible in an exceptional case).

Replacing the certificates within the context of what is known as a secure handshake (e.g. TLS handshake) ensures that the public key of the respective other subscriber is available to each subscriber. With the public key of the other subscriber, the messages determined herefor can be encrypted or its signature validated.

A function rule that maps a larger input quantity onto a smaller target quantity (a hash value) is generally understood to mean a hash function.

The inventive method makes it possible for a trustworthy client to convince the (web) server that the code executed in the browser is unchanged, without, however, transmitting the code in clear text to the web server. Instead of the clear text code, cryptographically formed values are transmitted in a secure manner. Moreover, this ensures that the afore-cited cryptographic values are always formed with respect to the code executed in the client.

Even if the code loaded into the client from the server remains unchanged over a longer period of time, the values transmitted from the client to the server for the purpose of checking turn out to be random for a potential attacker. Therefore, the attacker (even if he is to record a number of values) cannot draw any useful conclusions which, in spite of executing the manipulated code, could help him with his attempt to transmit a correct value to the server. Manipulations therefore do not remain undetected.

By executing the afore-described checking method used for ad-hoc detection of manipulations, it can be ensured that manipulation attempts are detected on an ad-hoc basis and the code executed in the client can therefore not be manipulated unnoticed (by a virus or an attacker). As a result, it is possible particularly advantageously to ensure an informed contribution to maintaining the code integrity and the integrity of the control system of the technical plant.

In the event that the hash values do not match, the client can be excluded from communicating with the control system of the technical plant. This prevents the client from executing a false or manipulated code and potentially causing damage in the control system of the technical plant.

The server preferably permits the client to communicate again with the control system if, after exclusion from the communication with the control system, the client registers again with the server and the previously explained integrity check then produces a match of the hash values. Here, reference is made to a rehabilitation of the client. The newly loaded client can advantageously also find out from the server about the reason as to why he would be excluded from communicating with the control system.

With the previously described, fully automated cycle for the immediate sanctioning in the case of a detected manipulation attempt and for rehabilitation of clients, as soon as these are no longer at risk and no longer present a security risk, it can contribute to maintaining the operation and to improving the availability of the technical system.

In an advantageous embodiment of the invention, in the event that after excluding communication with the control system the client reregisters with the server and for the second time the integrity check does not produce a match between the hash values, the server excludes the client from communicating with the control system and stores the client as a device to be rejected in the control system. The client is then located on a "Black List". This Black List is available to all subscribers, in particular servers, within the control system, so that the client can also no longer register with any further server. This is a full sanctioning. The client can only be moved into a state that permits it to communicate further with the control system via an administrator of the control system.

It is also an object of the invention to provide a client server architecture for a control system of a technical plant, where the client server architecture includes at least one first device comprising a client and at least one second device comprising a server, which is configured to perform the method in accordance with the previously described embodiments.

Moreover, it is also an object of the invention to provide a client server architecture for a control system of a technical plant, where the client server architecture includes at least one first device comprising a client and at least one second device comprising a server assigned to the client, where the client is configured to make contact with the server and to execute receive a code received from the server, where communication between the client and the control system exists via the server, where the server is configured to detect whether the code, which the client executes, matches the code that the client has received from the server, and where the server is further configured, in the event that the code does not match, to interrupt execution of the code by the client and to exclude the client from communicating with the control system.

In this regard, the server is preferably configured to store the client as a device to be rejected in a control system, if, after exclusion from the communication with the control system, the client has again made contact with the server, and on account of the execution of a code that does not match, has been excluded a second time from communicating with the control system.

It is also a further object of the invention moreover to provide a control system of a technical plant with a client server architecture in accordance with the previously disclosed embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The afore-described properties, features and advantages of this invention and the manner in which these are achieved will become clearer and more clearly intelligible in conjunction with the following description of the exemplary embodiment, which is explained in more detail in conjunction with the drawings, in which.

DETAILED DESCRIPTION OF THE EXEMPLARY EMBODIMENTS

Figure 1:
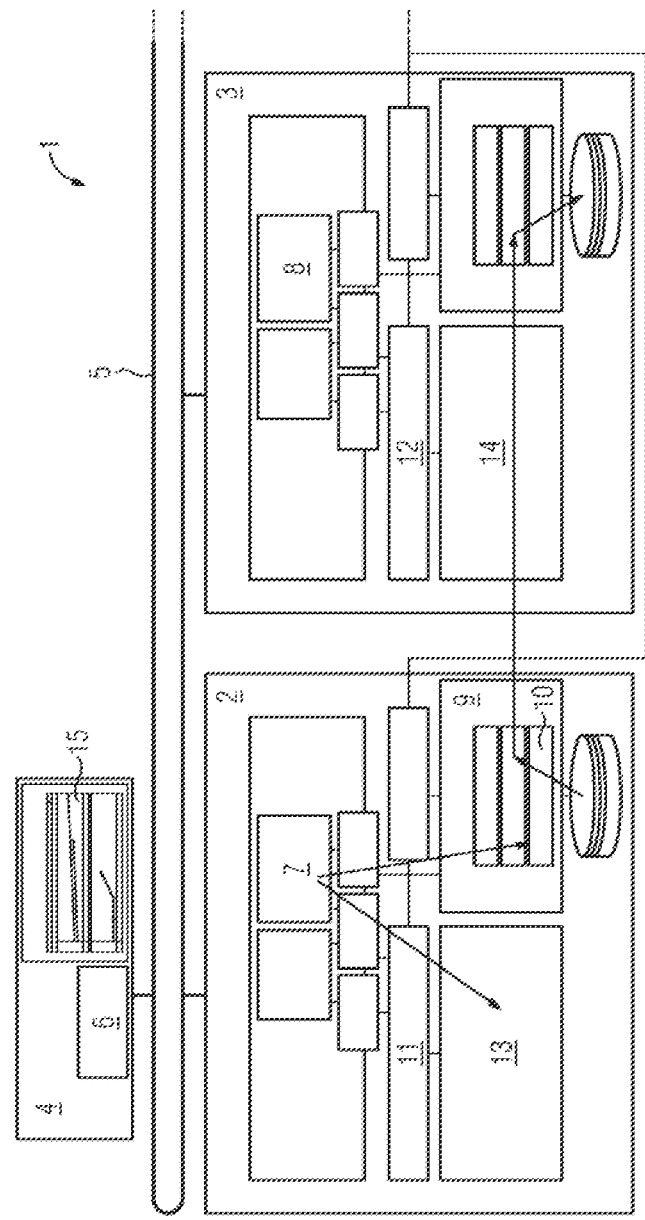
FIG. 1 is a schematic illustration of a part of an inventive control system 1 of a technical plant formed as a process engineering plant, in accordance with the invention.

FIG. 1 shows a part of an inventive control system 1 of a technical plant formed as a process engineering plant. The control system 1 comprises a first server of an operator control system or a first operator station server 2 and a second operation station server 3. Moreover, the control system 1 comprises an operator station client 4. The first operator station server 2, the second operator station server 3 and the operator station client 4 are interconnected via a terminal bus 5 and are connected to further components of the control system 1 (not shown) such as an engineering system server or a process data archive.

In the context of operator control and monitoring, a user or operator can have access to the first operator station server 2 and/or the second operator station server 3 via the operator station client 4 via the terminal bus 5. The terminal bus 5 can be formed, for instance, as an industrial Ethernet, without being restricted thereto.

The operator station client 4 has a component 6 referred to as "local client observer". The first operator station server 2 has a component 7 referred to as "client observer". The second operator station server 3 likewise has a component 8 referred to as "client observer".

The components "local client observer" 6 and "client observer" 7, 8 have asymmetric (public key) key pairs, where "X" refers to the respective asymmetric private key and "Y" refers to the respective asymmetric public key. For security reasons, the associated private keys should at best be securely stored in a hardware-bound manner (i.e., in what is known as a hardware secure element, e.g., TPM or HSM, integrated in the underlying hardware), or alternatively (with lower security requirements), such as in the Windows key store or in another key store.

The client 4 registers with the first operator station server 2 and downloads a code to be executed herefrom. The component "client observer" 7 of the first operator station server 6 initiates the code checking method, by generating a secret key (for security reasons, if possible, using pseudo random values), then encrypting these with the public key of the component "local client observer" 6 and signing the result (Enc) with its public key. The component "client observer" 7 then transfers the result to the component "local client observer" 6.

Here, the decryption and signature functions used are conventional prior art functions. The corresponding functions relating to "Enc" or "Sig" are referred to below as "Dec" or "Ver". It should be noted that a decryption or signature check function is produced for each encryption or signature function. The symmetrical secret key is regenerated by the component "client observer" 7 for each test cycle.

The component "local client observer" 6 receives a value, which consists of the value Enc and the associated signature Sig from the component "client observer" 7 of the first operator station server 2. First, by using the public key of the operator station server 2, it checks whether the signature Sig(Enc) is valid: Ver(Sig(Enc)=True?

In the event that the signature is valid, it decrypts the shared symmetrical secret key by using its private key. It then forms a hash value for the code (hash=h(Code)) received by the first operator station server 2, where a hash function h is used. The client 4 then encrypts the hash value with the shared symmetrical secret key and signs the result with its private key. It then transfers the overall result comprising encryption and signature to the component "client observer" 7 of the first operator station server 2. It is important to note that the transmitted value appears to be random to an outsider or attacker. As already mentioned, the attacker (even if he records a number of values) cannot draw any useful conclusions that could help him when attempting to transfer a correct value to the first operator station server 2 in spite of executing the manipulated code.

The component "client observer" 7 of the first operator station server 2 receives the encrypted and signed hash value of the code to be executed from the component "local client observer" 6. The component "client observer" 7 first checks whether the signature is valid by using the public key of the client 4. If this is the case, then the component "client observer" 6 decrypts the hash value by using the shared symmetrical secret key. The component "client observer" then checks whether the result of the encryption matches with the hash value 6 formed (and thus correct) with respect to the code stored on the first operator station server 2.

If yes, then the test method is concluded successfully, i.e., it was confirmed that the code loaded into the client 4 by the first operator station server 2 was not manipulated. On the other hand (if a manipulation was detected), the cycle described below is executed for sanctioning and rehabilitation.

If the first operator station server 2 detects a manipulation, it immediately interrupts the currently executed command (e.g., change in control value, and/or alarm acknowledgement . . . ). Furthermore, it terminates the current client session, i.e., it excludes the client 4 at least temporarily from communicating with the control system 1. The first operator station server 2 cancels a corresponding event or a corresponding security message, which informs the rest of the control system 1 of a possibly manipulated client 4. Furthermore, in a component 9 (referred to as "user profile service"), a "client blacklist" 10 is extended by the affected client 4. This is initially a remark and not an actual block.

Further operator station servers 3 are moved into the same knowledge state via a component 11, of the first operator station server 2, referred to as "mirroring". Irrespective of the operator station server 2, 3 with which the client 4 registers, it is known to the control system 1 that because of a manipulation, it is firstly "rehabilitated", i.e., is on probation, and not yet entirely excluded from the operator control and monitoring.

When the client 4 is reconnected with an operator station server 2, 3, the potentially manipulated code in the client 4 is reloaded from the respective operator station server 2, 3. In further tests, an evaluation is now implemented by the respective component "client observer" to determine whether the client 4 is rehabilitated. If this applies, then this can be rejected from the blacklist. If this does not apply, then the client 4 remains blocked accordingly.

With a component "event manager" 11, 12 integrated in the first or second operator station server 2, 3 (all events detected within the scope of the described cycles are basically archived), a historical or forensic analysis (Audit Trail) can be performed independently hereof, with respect to which clients 4 were potentially manipulated in the past, although they were rehabilitated in the meantime. The events or security messages are accessible via a respective process image 13, 14 of the first or second operator station server 2, 3 of a message sequence display 15 of the client 4.

On account of the security messages of the runtime environments stored in the process images, all operators of the operator control and monitoring of the process engineering plant have knowledge of problematic clients 4, which represents information that is important for the operation of the plant. By continuously monitoring the code check, the generation of the corresponding events (if a manipulation was detected) and by initiating the immediate reaction thereto (in the form of a sanctioning), this will contribute to the conformity with the corresponding International Electrotechnical Commission (IEC) 62443 requirements as the leading Industrial Security Standards regarding the continuous security monitoring "continuous monitoring" and the timely response to reported events and alarms ("timely response to events").

The availability and integrity represent the most important requirements of the IEC 62443. As a result, the disclosed embodiments of the invention generally contributes to the conformity with IEC 62443 and with the requirements based thereupon within the scope of the corresponding (increasingly obligatory) certifications and audits.

Figure 2:
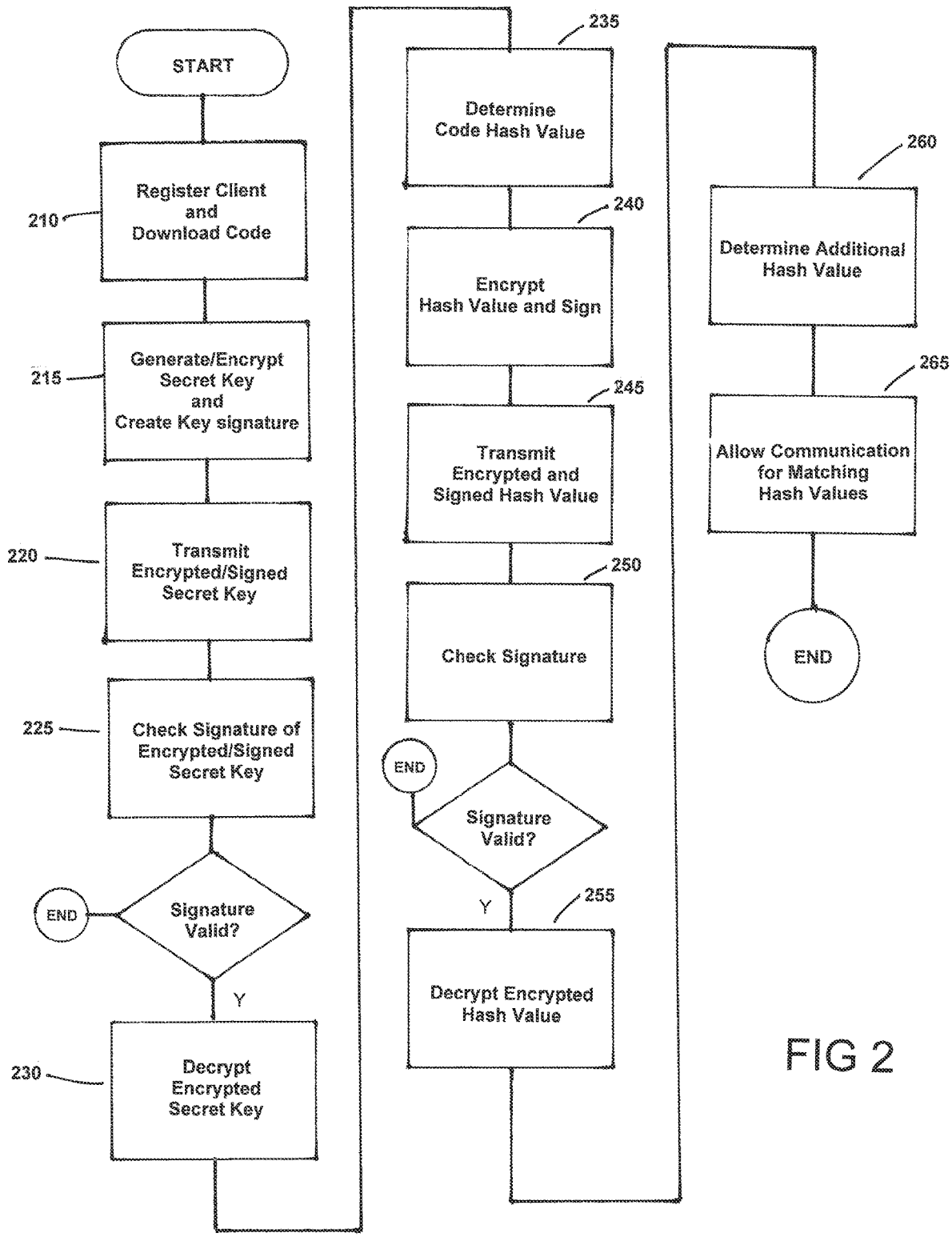
FIG. 2 is flowchart of the method in accordance with the invention.

FIG. 2 is a flowchart of the method for checking integrity of a code to be executed by a client 4 for a match with another code stored on a server 2, 3 in a client server architecture of a control system (1) of a technical plant, where the client server architecture comprises at least a first device comprising a client (4), which is configured to communicate with the control system (1), and at least one second device comprising the server 2, 3.

The method comprises a) registering the client 4 with the server 2, 3 and downloading the code to be executed by the client 4 from the server 2, 3, as indicated in step 210. Next, b) a secret key is generated and encrypted aided by a public key of the client 4 and a signature for the encrypted secret key is created aided by a public key of the server via the server 2, 2, as indicated in step 215.

Next, c) the previously encrypted and signed secret key is transmitted from the server 2, 3 to the client 4, as indicated in step 220. Next, d) the created signature of the encrypted and signed secret key is checked aided by the public key of the server 2, 3, as indicated in step 225. Next, e) the encrypted secret key aided is decrypted by a private key of the client 4 via the client 4, if the previously checked signature is valid, as indicted in step 230.

A hash value of the code aided by a hash function via the client 4 is now determined, as indicated in step 235. Next, g) the hash value is encrypted aided by the secret key and the encrypted hash value signed aided by the private key of the client 4 via the client 4, a indicated in step 240.

Next, h) the encrypted and signed hash value is transmitted from the client 4 to the server 2, 3, as indicated in step 245. Next, i) the signature of the encrypted and signed hash value is checked aided by the public key of the client 4 via the server 2, 3, as indicated in step 250. Next, j) the encrypted hash value is decrypted with the aid of the secret key via the server 2, 3, if the previously checked signature is valid, as indicated in step 255.

Next, k) an additional hash value of a copy of the code stored on the server 2, 3 and not transmitted to the client 4 via the server 2, 3 is determined, as indicated in step 260. Next, l) the server 2, 3 allows the client 4 to communicate with the control system of the technical plant in an event the hash value and the additional hash value match, as indicated in step 265.

Although the invention was illustrated and described more closely in detail by the preferred exemplary embodiment, the invention is not restricted by the disclosed examples and other variations can be derived herefrom by the person skilled in the art without departing from the scope of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking integrity of operational code to be downloaded and executed by a client for a match with another operational code stored on servers in a client server architecture of a control system of a technical plant, the client server architecture comprising at least a first device comprising a client, which is configured to communicate with the control system, and the servers comprising first and second servers, the method comprising:
   a) registering the client with the servers and downloading the operational code to be executed by the client from at least one of the first and second servers;
   b) generating a secret key, encrypting the secret key aided by a public key of the client and creating a signature for the encrypted secret key aided by a public key of a server via at least one of the first and second servers;
   c) transmitting the previously encrypted and signed secret key from at least one of the first and second servers to the client;

d) checking the created signature of the encrypted and signed secret key aided by the public key of at least one of the first and second servers;
e) decrypting the encrypted secret key aided by a private key of the client via the client, if the previously checked signature is valid;
f) determining a hash value of the operational code aided by a hash function via the client;
g) encrypting the hash value aided by the secret key and signing the encrypted hash value aided by the private key of the client via the client;
h) transmitting the encrypted and signed hash value from the client to at least one of the first and second servers;
i) checking the signature of the encrypted and signed hash value aided by the public key of the client via at least one of the first and second servers;
j) decrypting the encrypted hash value with the aid of the secret key via the server, if the previously checked signature is valid;
k) determining an additional hash value of a copy of the operational code stored on the server and not transmitted to the client via at least one of the first and second servers; and
l) allowing, by at least one of the first and second servers, the client to communicate within the control system of the technical plant over a terminal bus in an event the hash value and the additional hash value match.

2. The method as claimed in claim 1, wherein the client is excluded from communicating with the control system upon failure of the hash value and the additional hash value to match.

3. The method as claimed in claim 2, wherein in an event the client, after exclusion from communicating with the control system, registers again with at least one of the first and second servers and an integrity check produces a match of the hash values, at least one of the first and second servers permits the client to communicate again with the control system.

4. The method as claimed in claim 2, wherein in an event the client, after exclusion from communication with the control system, registers again with at least one of the first and second servers, and the integrity check fails to produce a match with the hash values, at least one of the first and second servers permanently excludes the client from communicating with the control system and stores the client as a device to be rejected in the control system.

5. A client server architecture for a control system of a technical plant comprising at least one processor and memory, wherein the client server architecture comprising:
at least one first device comprising at least one client; and
first and second servers, the at least one client communicating with the first and second servers within the control system of the technical plant over a terminal bus;
wherein the client server architecture is configured to:
a) register the at least oneclient with at least one of the first and second servers and download operational code to be executed by the at least one client from at least one of the first and second servers;
b) generate a secret key, encrypt the secret key aided by a public key of the at least oneclient andcreate a signature for the encrypted secret key aided by a public key of a server via at least one of the first and second servers;
c) transmit the previously encrypted and signed secret key from at least one of the first and second servers to the at least one client;
d) check the created signature of the encrypted and signed secret key aided by the public key of at least one of the first and second servers;
e) decrypt the encrypted secret key aided by a private key of the at least one client via the at least one client, if the previously checked signature is valid;
f) determine a hash value of the operational code aided by a hash function via the at least one client;
g) encrypt the hash value aided by the secret key and sign the encrypted hash value aided by the private key of the at least one client via the at least one client;
h) transmit the encrypted and signed hash value from the at least one client to at least one of the first and second servers;
i) check the signature of the encrypted and signed hash value aided by the public key of the at least one client via at least one of the first and second servers;
j) decrypt the encrypted hash value aided by the secret key via at least one of the first and second servers, if the previously checked signature is valid;
k) determine an additional hash value of a copy of the operational code stored on at least one of the first and second servers and not transmitted to the at least one client via at least one of the first and second servers; and
l) allow, by at least one of the first and second servers, the at least one client to communicate with the control system of the technical plant in an event the hash value and the additional hash value match.

6. The client server architecture for the control system of the technical plant as claimed in claim 5, wherein the at least one client is configured to make contact with at least one of the first and second servers to receive another operational code from at least one of the first and second servers and to execute the received other operational code, wherein communication exists between the client and the control system via at least one of the first and second servers;
wherein at least one of the first and second servers is configured to detect whether the operational code, which the client executes, matches the other operational code transmitted to the at least one client and stored on at least one of the first and second servers; and
wherein at least one of the first and second servers is configured to interrupt execution of the operational code via the at least one client, in an event the operational code fails to match the other operational code, and is configured to exclude the at least one client from communicating with the control system.

7. The client-server architecture as claimed in claim 6, wherein in an event the at least one client, after exclusion from communicating with the control system, again makes contact with at least one of the first and second servers, and on account of execution of the operational code which fails to match, has been excluded a second time from communicating with the control system, at least one of the first and second servers is further configured to store the at least one client as a device to be rejected in the control system.

8. The control system of the technical plant as recited in claim 5, including the client server architecture as claimed in claim 5.

* * * * *